US010648356B2

(12) United States Patent
Le Marechal et al.

(10) Patent No.: US 10,648,356 B2
(45) Date of Patent: May 12, 2020

(54) BYPASS TURBOMACHINE FITTED WITH BLEED SYSTEM

(71) Applicant: SAFRAN AIRCRAFT ENGINES, Paris (FR)

(72) Inventors: Eric Pierre Georges Le Marechal, Moissy-Cramayel (FR); Xavier Jean Yves Alain Agneray, Moissy-Cramayel (FR); Thierry Georges Paul Papin, Moissy-Cramayel (FR); Mathieu Daniel Marie Van Gansen, Moissy-Cramayel (FR); Cédric Zaccardi, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/462,804

(22) PCT Filed: Nov. 16, 2017

(86) PCT No.: PCT/FR2017/053132
§ 371 (c)(1),
(2) Date: May 21, 2019

(87) PCT Pub. No.: WO2018/096239
PCT Pub. Date: May 31, 2018

(65) Prior Publication Data
US 2019/0368372 A1     Dec. 5, 2019

(30) Foreign Application Priority Data
Nov. 25, 2016  (FR) ...................... 16 61540

(51) Int. Cl.
*F01D 17/10* (2006.01)
*F01D 17/14* (2006.01)
(Continued)

(52) U.S. Cl.
CPC ......... *F01D 17/105* (2013.01); *F01D 17/141* (2013.01); *F02C 6/08* (2013.01);
(Continued)

(58) Field of Classification Search
CPC ...... F01D 17/105; F01D 17/141; F01D 17/14; F01D 17/145; F01D 9/065; F02C 6/08;
(Continued)

(56) References Cited

U.S. PATENT DOCUMENTS

| 4,086,761 A | 5/1978 | Schaut et al. |
| 2007/0186535 A1* | 8/2007 | Powell ...................... F02K 1/08 |
| | | 60/226.1 |

(Continued)

FOREIGN PATENT DOCUMENTS

| DE | 879280 C | 6/1953 |
| DE | 3606944 A1 * | 9/1987 .............. F02B 37/18 |

(Continued)

OTHER PUBLICATIONS

International Search Report dated Feb. 21, 2018, issued in corresponding International Application No. PCT/FR2017/053132, filed Nov. 16, 2017, 2 pages.
(Continued)

*Primary Examiner* — Mark A Laurenzi
*Assistant Examiner* — Mickey H France
(74) *Attorney, Agent, or Firm* — Christensen O'Connor Johnson Kindness PLLC

(57) ABSTRACT

A bypass turbine engine is described. The engine includes a system for bleeding gas from a primary stream to a secondary stream. The system may include two coaxial rings extending one around the other. A perforated internal first ring may be situated at the level of an outer casing and may extend substantially in a continuation of the outer casing. A perforated external second ring may be mounted such that it
(Continued)

slides circumferentially on the first ring between a first position in which the perforations of the rings do not communicate with one another and a second bleed position in which the perforations of the rings communicate with one another.

12 Claims, 2 Drawing Sheets

(51) Int. Cl.
    *F02C 6/08*     (2006.01)
    *F04D 27/02*     (2006.01)
    *F04D 29/54*     (2006.01)

(52) U.S. Cl.
    CPC ........ *F04D 27/0215* (2013.01); *F04D 29/545* (2013.01); *F05D 2270/101* (2013.01)

(58) Field of Classification Search
    CPC .. F02C 9/18; F05D 2270/101; F04D 27/0215; F04D 27/023; F04D 27/009; F04D 29/545
    USPC ........ 60/226 R, 226.1, 262, 226.3, 782, 785, 60/336
    See application file for complete search history.

(56) References Cited

U.S. PATENT DOCUMENTS

2008/0141677 A1* 6/2008 Brillert ................... F01D 5/081
    60/785ke

2009/0169366 A1* 7/2009 Petitjean ............... F01D 17/105
    415/145
2010/0158668 A1* 6/2010 Ottaviano ................ F02C 3/08
    415/104
2011/0173984 A1* 7/2011 Valeev .................... F01D 9/023
    60/752
2013/0340440 A1* 12/2013 LeBlanc .................. F02C 6/08
    60/785
2014/0075956 A1   3/2014 Patsouris
2015/0308289 A1  10/2015 Lacroix et al.
2017/0114910 A1* 4/2017 Ottow .................. F16K 11/076

FOREIGN PATENT DOCUMENTS

EP     0374004 A1   12/1989
FR     2349740 A1   11/1977
FR     2976022 A1   12/2012
FR     2982904 A1    5/2013
FR     3020400 A1   10/2015

OTHER PUBLICATIONS

Written Opinion of the International Searching Authority dated Feb. 21, 2018, issued in corresponding International Application No. PCT/FR2017/053132, filed Nov. 16, 2017, 5 pages.

Written Opinion dated May 28, 2019, issued in corresponding International Application No. PCT/FR2017/053132, filed Nov. 16, 2017, 5 pages.

\* cited by examiner

BYPASS TURBOMACHINE FITTED WITH BLEED SYSTEM

TECHNICAL FIELD

The present invention relates to a bypass turbine engine fitted with a bleed system.

STATE OF THE ART

The state of the art comprises in particular documents DE-C-879 280, FR-A1-2 349 740, EP0374004, FR-A1-2 976 022, FR-A1-2 982 904, and FR-A1-3 020 400.

A bypass turbine engine comprises a flow duct of a primary stream or hot stream and a flow duct of a secondary stream or cold stream. It is known to fit such a turbine engine with a bleed system or VBV system (Variable Bleed Valve) intended to regulate the flow rate of air intake into the primary duct in order, in particular, to limit the risks of pumping of the compressor of the turbine engine by making it possible for the evacuation or the bleeding of an air flow into the secondary duct. In addition, in case of accidental penetration of water into the primary duct in particular in the form of rain or hail, or of various debris, which are likely to damage the operation of the turbine engine, these systems make it possible to recover this water or this debris which are centrifuged and conveyed to the secondary duct.

There are currently several types of VBV systems that can be grouped together into systems with doors, in particular scooping, i.e. which consists of a scoop at least one moment of the opening thereof, and systems with slots.

Systems with doors are heavy and require synchronised control to operate the doors. They therefore require means of control that can be bulky, with complex kinematics. In addition, for systems with scooping doors, it is difficult to provide a seal.

Slot systems do not generally make it possible for the evacuation of debris but make it possible for the bleeding in pressure of the primary duct with a simpler, less bulky and more robust system in terms of control.

FIG. 1 shows a bleed system with a slot. The bleed system comprises at least one bleed duct 10 of which one internal end opens onto an outer casing 12 of the flow duct 14 of the primary stream I, by forming a "slot" 22, and of which one external end opens onto an inner casing 16 of the flow duct 18 of the secondary stream II. The system further comprises at least one actuator for movement of at least one moveable element 20 between a first closed position of the duct and an open position of the duct which is a bleed position. The moveable element 20 is here a guillotine ring that can be moved in the axial direction between the two aforementioned positions. However, generally and as shown here, the system with slots proposed involves the existence of a so-called dead zone Z on the slot 22. This zone Z substantially disturbs the flow of the primary stream and causes disturbing load losses.

The present invention proposes a simple, effective and economical solution to this problem.

DISCLOSURE OF THE INVENTION

The invention proposes a bypass turbine engine, comprising a first annular flow duct of a primary stream and a second coaxial annular flow duct of a secondary stream extending around this first duct, the turbine engine further comprising a system for bleeding gas from the primary stream to the secondary stream, said system comprising at least one bleed duct of which one internal end opens onto an outer casing of the first duct and of which one external end opens onto an inner casing of the second duct, said system further comprising at least one actuator for the movement of at least one moveable element between a first closed position of the duct and a second bleed and open position of the duct, characterised in that the system comprises two coaxial rings extending one around the other, a perforated internal first ring situated at the level of said outer casing and extending substantially in the extension of this outer casing, and a perforated external second ring mounted such that it slides circumferentially on the first ring, between said first position in which the perforations of the rings do not communicate with one another, and said second position in which the perforations of the rings communicate with one another, said actuator being located between said inner and outer casings outside of the bleed flow defined by said duct.

The invention thus makes it possible to resolve the prior art problem linked with the load losses of a bleed system of the "slot" type. The rings are here situated on this slot and the internal ring, that extends in the extension of the casing, makes it possible to "close off" the slot and to prevent the load losses in this zone. The internal ring thus reproduces a portion of the casing, or is fully integral with the latter, which is advantageous from an aerodynamic point of view. In addition, the actuator of the control of the external ring is situated outside the bleed air flow and the primary and secondary stream and therefore is not likely to generate load losses in these streams.

The turbine engine according to the invention can comprise one or more of the following characteristics, taken separately from one another or in combination with one another:

- the internal ring is fixed with respect to said outer casing; alternatively, it is also contemplated that it is the internal ring that is mobile;
 - the internal and external rings have the same axial dimension;
 - the perforations of said internal and external rings have substantially identical shapes and dimensions;
 - the internal and external rings each comprise one or two annular rows of slots, for example, regularly spaced in the circumferential direction;
 - the internal and external rings each comprise a single annular row of slots, the slots of the rings being situated in the same plane substantially perpendicular to the axis of revolution of the rings;
 - the internal and external rings each comprise at least two annular rows of slots, the slots of one of the rows of each ring being disposed in a staggered arrangement with respect to the slots of the other of the rows of this ring;
 - the cumulative circumferential extent of the slots of the row or of each one of the rows of each ring is between 160 and 180°;
 - the slots each have a general elongated shape extending substantially in the circumferential direction; and
 - the internal and external rings each comprise a number of slots less than 50, and for example between 5 and 20.

DESCRIPTION OF THE FIGURES

The invention will be better understood and other details, characteristics and advantages of the invention will appear more clearly upon reading the following description given by way of a non-limiting example and in reference to the appended drawings, in which.

DETAILED DESCRIPTION

Figure 1:
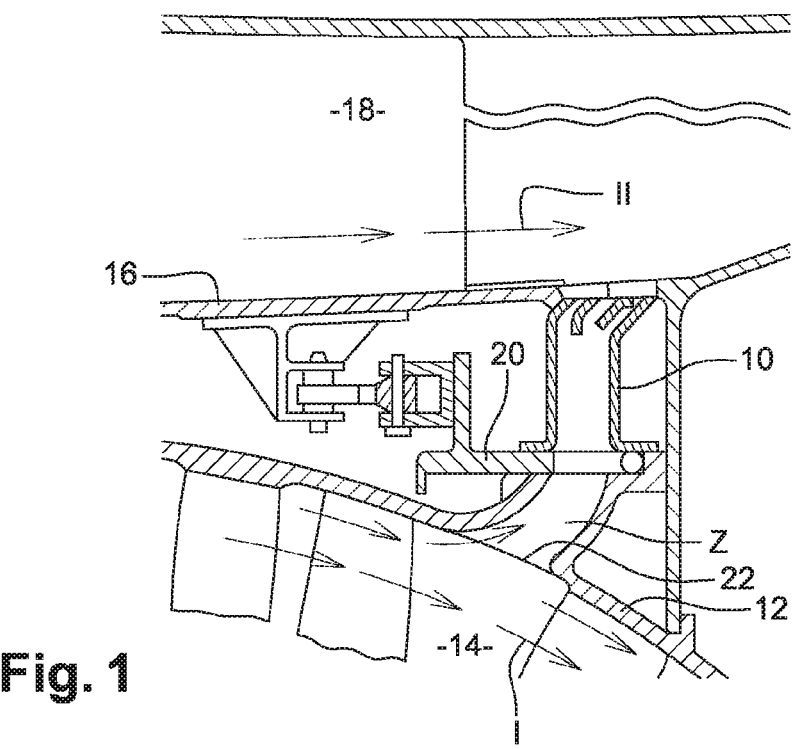
FIG. 1 is a partial schematic half-view as an axial cross-section of a bypass turbine engine fitted with a bleed system according to the prior art.

FIG. 1 has been described above and shows the prior art.

Figure 2:
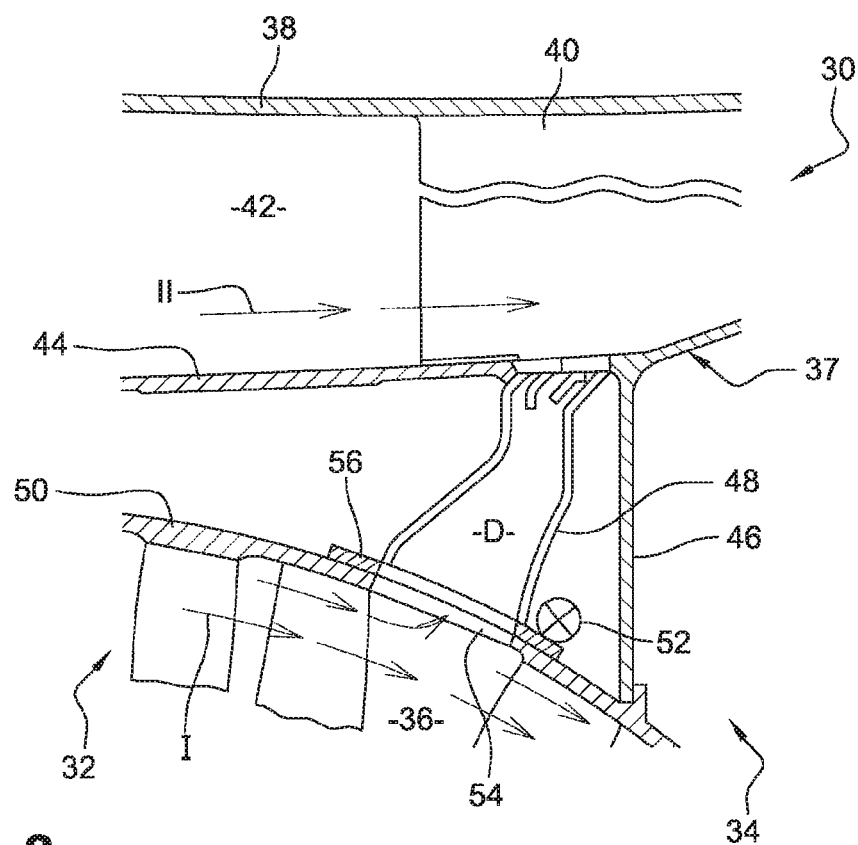
FIG. 2 is a partial schematic half-view as an axial cross-section of a bypass turbine engine fitted with a bleed system according to the invention.

FIG. 2 is a partial schematic view as an axial cross-section of a bypass turbine engine 30. Such a turbine engine comprises in general, from the upstream to the down stream along the direction of the flow of the gases, a low pressure compressor 32, a high pressure compressor 34, a combustion chamber (not visible), a high pressure turbine (not visible) and a low pressure turbine (not visible), which define a flow duct 36 of a primary stream of gas I.

The rotor of the high pressure turbine is secured to the rotor of the high pressure compressor 34 so as to form a high pressure body, while the rotor of the low pressure turbine is secured to the rotor of the low pressure compressor 32 so as to form a low pressure body, such that each turbine drives the associated compressor in rotation about a longitudinal axis of the turbine engine under the effect of the thrust of the gases coming from the combustion chamber.

An intermediate casing 37 is usually interposed between the low pressure 32 and high pressure 34 compressors.

In the case of bypass turbine engines, which comprise a fan shrouded by a nacelle 38 to generate a secondary stream II, the intermediate casing 37 generally comprises arms 40 that pass through the flow duct 42 of this secondary stream II.

The arms 40 extend between the nacelle 38 and an inner annular casing 44 that delimits the duct 42 by the radially external face thereof (opposite to the longitudinal axis of the turbine engine). This casing 44 here forms part of the intermediate casing 37.

The turbine engine 30 comprises a system 46 for bleeding gas from the primary stream I to the secondary stream II. The system 46 comprises at least one bleed duct 48 of which a radially internal end opens onto an outer casing 50 that delimits the duct 36 of the primary stream I via the radially internal face thereof, and of which a radially external end opens onto the casing 44.

The system 46 further comprises at least one actuator 52 for the movement of at least one moveable element between a first closed position of the duct 48 and a second bleeding and open position of the duct.

Figure 3:
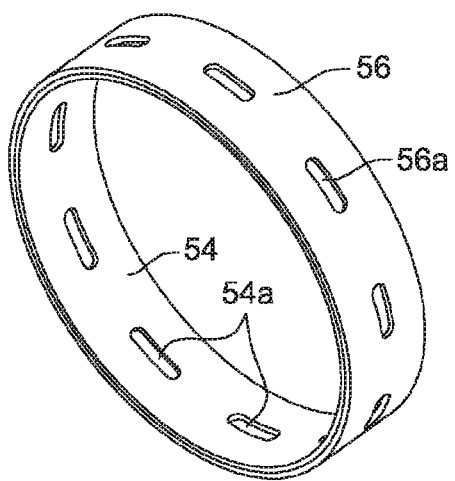
FIGS. 3 and 4 are schematic, perspective views of rings of the bleed system of FIG. 2, respectively in closed and open positions of a bleed duct.
Figure 4:
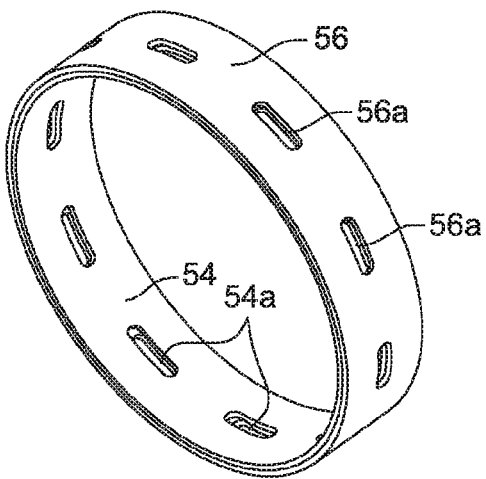

In the embodiment shown in FIGS. 1 to 3, the system 46 comprises two coaxial rings 54, 56 extending one around the other. A perforated internal first ring 54 is situated at the level of the outer casing 50 and extends substantially in the axial extension of this outer casing. The internal ring is preferably fixed with respect to the outer casing 50. A perforated external second ring 56 is mounted such that it slides circumferentially on the first ring 54, between a position, that corresponds to the aforementioned first closed position, in which the perforations 54a, 56a of the rings do not communicate with one another (FIG. 3), and a position, that corresponds to the aforementioned second position, in which the perforations 54a, 56a of the rings communicate with one another (FIG. 4).

The system 46 (FIG. 4) further comprises an actuator 52, such as a cylinder, which is located between the casings 44, 50 outside of the bleed duct D defined by the duct 48.

In the embodiment shown in FIGS. 1 to 3, the rings 54, 56 have one same axial dimension. The external ring 56 entirely covers the internal ring 54.

The perforations 54a, 56a of the rings 54, 56 have substantially identical shapes and dimensions. They are here in the form of slots. Each ring here comprises one single annular row of slots regularly spaced in the circumferential direction. Each slot has a generally elongated shape extending substantially in the circumferential direction. Each slot has an angular extent between 5 and 20°, and for example between 10 and 18°. Each ring has a number of slots less than 50, and for example between 5 and 20. The cumulative circumferential extent of the slots of each ring is between 160 and 180°.

The slots of the rings extend substantially in one same plane substantially perpendicular to the axis of revolution of the rings, which is the longitudinal axis of the turbine engine 30. Two adjacent slots of each ring are separated from one another by a solid portion.

In the position of FIG. 3, the slots of each ring are aligned in the radial direction with solid portions of the other ring. The flow duct of the primary stream I is therefore not in fluidic communication with the duct of the bleed duct.

In the position of FIG. 4, the slots of the rings are aligned in the radial direction. The flow duct of the primary stream I is in fluidic communication with the duct of the bleed duct by the slots, and a bleed flow can pass through the duct 48 to the duct of the secondary stream.

The movement of the external ring 56, from the position of FIG. 3 to the position of FIG. 4, is provided by the actuator 52. In the example shown, this movement is carried out on an angle of about 15-20°.

Figure 5:
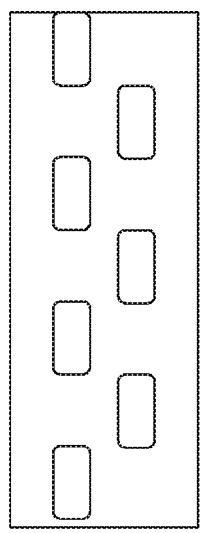
FIG. 5 is a very schematic partial view of a ring of an alternative embodiment of a bleed system for a turbine engine according to the invention that makes it possible to cover the entire circumference with bleed ducts.

FIG. 5 shows an alternative embodiment in which the two rings (although only one is shown) each comprise two annular rows of slots. The slots of a first row of each ring are disposed in a staggered arrangement with respect to the slots of the other row of this ring.

Each slot has a generally elongated shape extending substantially in the circumferential direction. Each slot has an angular extent between 2 and 10°. Each ring has a number of slots less than 50. The cumulative circumferential extent of the slots of each ring is between 160 and 180°.

The rows of slots of a ring are located in two planes that are parallel to one another and substantially perpendicular to the axis of revolution of the rings, which is the longitudinal axis of the turbine engine. The rows of slots of the other ring are located respectively in these planes. In each row, two adjacent slots are separated from one another by a solid portion.

The external ring can be moved on the internal ring from a closed position in which the slots thereof are aligned in the radial direction with solid portions of the internal ring, to an open position in which the slots of the rings are aligned in the radial direction. The movement of the external ring 56 between these positions can be carried out over an angle of about 5°.

The rings 54, 56 can have, in particular, a general cylindrical or tapered shape or any other shape that makes it possible for a rotation of one ring on the other.

Although this is not shown, the rings can be fitted with abutment or support means such that the rings engage with one another and specifically define the aforementioned open and closed positions. The rings can furthermore be fitted with sealing means.

Several configurations can be considered for the duct 48:
- an annular duct that connects all of the slots to the exhaust grids in the secondary duct (of which the number and position can vary)
- one duct per slot;
- a mixture of the two preceding configurations; one duct for several slots.

The invention can make it possible to:
- reduce the aerodynamic losses in the closed position (the aforementioned dead zone is suppressed or limited to the maximum),
- reduce the mass of the bleed system with respect to those of the prior art, and
- increase the robustness of the control (actuating system simplified to the maximum): at least, one single actuator can be required to open or close the system.

The invention claimed is:

1. A bypass turbine engine, comprising
a first annular flow duct of a primary stream and a second coaxial annular flow duct of a secondary stream extending around the first duct, the turbine engine further comprising a system configured to bleed gas from the primary stream to the secondary stream, said system comprising at least one bleed duct of which one internal end opens onto an outer casing of the first duct and of which one outer end opens onto an inner casing of the second duct, said system further comprising at least one actuator that moves at least one moveable element between a first closed position of the duct and a second bleed and open position of the duct,
wherein the system further comprises two coaxial rings,
a perforated internal first ring situated at a level of the outer casing and the perforated internal first ring extending substantially in an extension of the outer casing, and a perforated external second ring mounted to slide circumferentially on the first ring, between the first closed position in which perforations of the first and second rings do not communicate with one another, and the second open position in which the perforations of the first and second rings communicate with one another, the at least one actuator being located between the inner and outer casings outside of the at least one bleed duct defined by the at least one bleed duct.

2. The bypass turbine engine according to claim 1, wherein the internal ring is fixed with respect to the outer casing.

3. The bypass turbine engine according to claim 1, wherein the internal and external rings have the same axial dimension.

4. The bypass turbine engine according to claim 1, wherein the perforations of the internal and external rings have substantially identical shapes and dimensions.

5. The bypass turbine engine according to claim 1, wherein the internal and external rings each comprise at least one annular row of slots regularly spaced in the circumferential direction.

6. The bypass turbine engine according to claim 5, wherein the internal and external rings each comprise one annular row of slots, the slots of the internal and external rings being situated in a same plane that is substantially perpendicular to an axis of revolution of the rings.

7. The bypass turbine engine according to claim 5, wherein the internal and external rings each comprise at least two annular rows of slots, each annular row of slots offset from the other row of slots.

8. The bypass turbine engine according to claim 7, wherein the cumulative circumferential extent of the slots of the row is between 160° and 180°.

9. The bypass turbine engine according to claim 5, wherein the slots each have a general elongated shape extending substantially in the circumferential direction.

10. The bypass turbine engine according to claim 5, wherein the internal and external rings each comprise a number of slots less than 50.

11. The bypass turbine engine according to claim 7, wherein the cumulative circumferential extent of each one of the rows of each ring is between 160° and 180°.

12. The turbine engine according to claim 10, wherein the internal and external rings each comprise a number of slots between 5 and 20.

* * * * *